(12) United States Patent
Biere et al.

(10) Patent No.: US 7,742,762 B1
(45) Date of Patent: Jun. 22, 2010

(54) SYSTEMS AND METHODS FOR REMOTE NOTIFICATION, DIAGNOSTICS AND REMEDY MANAGEMENT

(75) Inventors: Devon L. Biere, Olathe, KS (US); Robert E. Urbanek, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 147 days.

(21) Appl. No.: 11/556,562

(22) Filed: Nov. 3, 2006

(51) Int. Cl.
H04W 24/00 (2009.01)
H04M 3/00 (2006.01)

(52) U.S. Cl. ...................................... 455/423; 455/419
(58) Field of Classification Search ................. 455/423, 455/67.1, 419
See application file for complete search history.

(56) References Cited

U.S. PATENT DOCUMENTS 6,745,011 B1 * 6/2004 Hendrickson et al. .... 455/67.11
2004/0058651 A1 * 3/2004 Ross et al. ............... 455/67.11
2004/0152455 A1 * 8/2004 Herle ......................... 455/419
2004/0186884 A1 * 9/2004 Dutordoir ................... 709/206
2004/0198331 A1 * 10/2004 Coward et al. ........... 455/414.1
2006/0217116 A1 * 9/2006 Cassett et al. ............... 455/423
2006/0252376 A1 * 11/2006 Fok et al. ................. 455/67.13

* cited by examiner

Primary Examiner—Nghi H Ly
Assistant Examiner—Joseph Dean, Jr.

(57) ABSTRACT

A system and method are provided for remote notification, diagnostics, and remedy management. The method includes interfacing a monitored system for an enterprise via a carrier network, and when the monitored system detects a problem, notifying the selected appropriate user by sending a notification to the user's mobile device, and confirming delivery of the notification. The method also includes authenticating the user according to at least one of 1) the user's subscriber identifier, and 2) the user's mobile device identifier. Optionally, the user may be additionally authenticated at a second layer according to a user name password identifier provided by the user at a prompt. The method additionally includes enabling access via the mobile device to the monitored system using one or more customized applications that enable diagnosis and remediation of the problem.

17 Claims, 4 Drawing Sheets

SYSTEMS AND METHODS FOR REMOTE NOTIFICATION, DIAGNOSTICS AND REMEDY MANAGEMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

With various technologies, today's workforce is becoming increasingly mobile. For example, telecommuting from a remote terminal located in an employee's home has become routine. Various telecommunications devices have enabled employees to send and receive emails, as well as receive and make telephone calls from remote locations as if made from the office.

These technologies have yet to fully mobilize the employee, in that for many enterprise-crucial activities including problem management, the employee must still log in to the enterprise network from a remote terminal. Individuals who serve as on-call problem management are still tied to the office or a remote terminal in their home in order to handle diagnostics and repairs upon discovery of a problem.

SUMMARY

Accordingly, systems and methods for mobile-device based remote notification, diagnostics, and remedy management are provided. Some method embodiments include interfacing a monitored system for an enterprise via a wireless carrier network. When the monitored system detects a problem based on the occurrence of a preset condition, an appropriate user is selected to notify of the problem according to a business logic rule. The selected user is notified by sending a notification to the user's mobile device. The method further includes confirming delivery of the notification without requiring action by the mobile device or the user. The method also includes authenticating the selected user according to at least one of 1) the user's subscriber identifier, 2) the user's mobile device identifier, and 3) a user name password identifier provided by the user at a prompt. The method further includes enabling access via the mobile device to the monitored system using one or more customized applications, whereby the user may diagnose and remedy the problem.

According to some embodiments, an application-enabling carrier framework is provided in a wireless carrier network for remote notification, diagnostics, and remedy management. The carrier framework includes a notification unit that, when a problem is detected within a monitored system, applies a business logic rule to select a user to notify of the problem, and sends a notification to the mobile device of the selected user. The carrier framework also includes an authentication unit that authenticates the identity of the selected user according to at least one of 1) the user's subscriber identifier, 2) the user's mobile device identifier, and 3) a user name password identifier provided by the user at a prompt. The carrier framework also includes a status confirmation unit that confirms delivery of the notification to the mobile device without requiring action by the mobile device or the user. The carrier framework also includes a diagnostic unit that enables access to the monitored system through a customized application such that the user may review monitored system data from the mobile device. The carrier framework also includes a remedy application unit that enables access to the monitored system through a customized application such that the user may execute actions to remedy the problem in the monitored system data from the mobile device.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following description, taken in connection with the accompanying drawings, wherein like reference numerals represent like parts.

DETAILED DESCRIPTION

Figure 1:
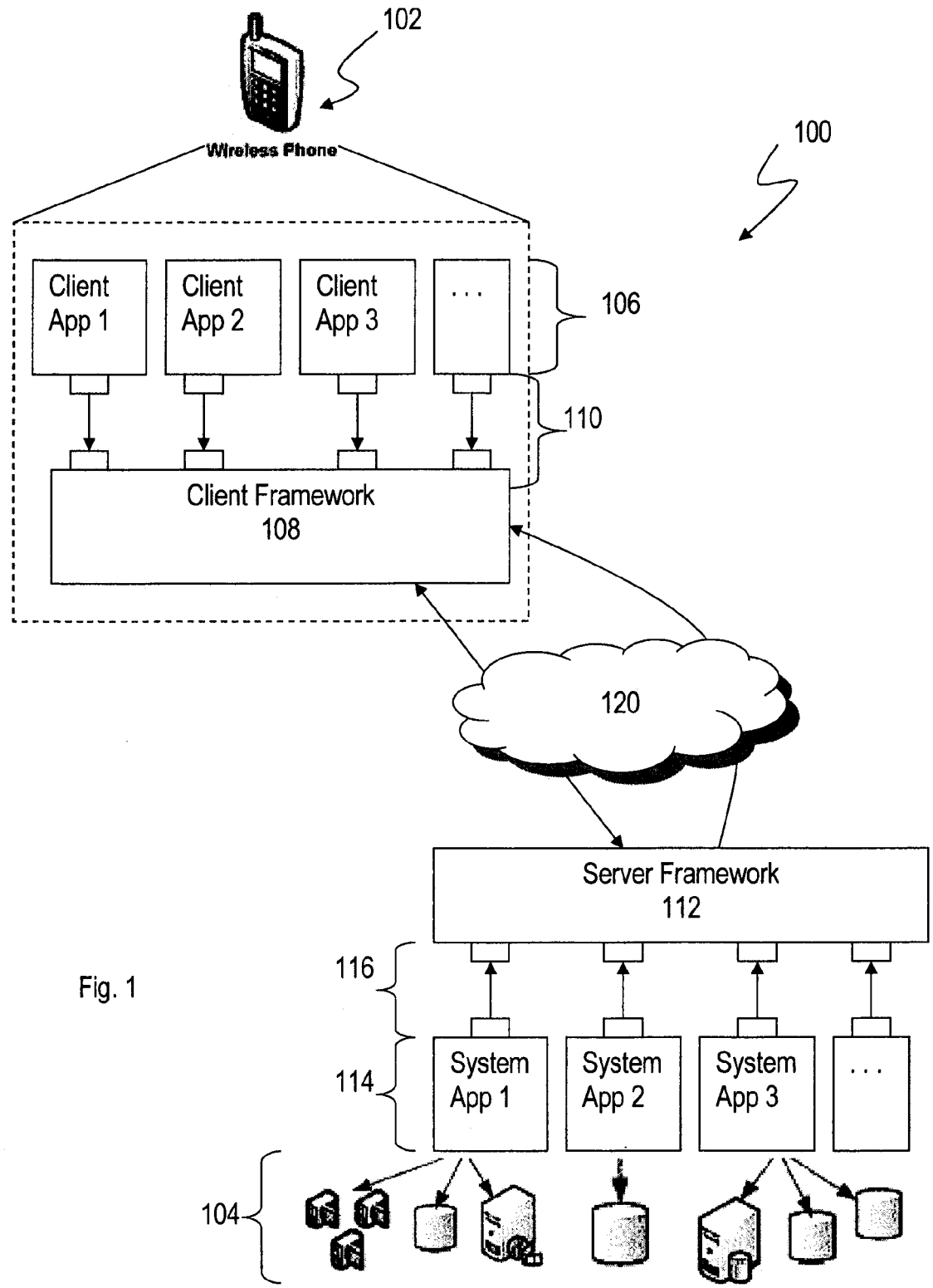
FIG. 1 is a block diagram of a high-level architecture for systems according to various embodiments of the present disclosure.

It should be understood at the outset that although an illustrative implementation of various embodiments is provided below, the present system may be implemented using any number of techniques, whether currently known or not yet in existence. The present disclosure should in no way be limited to the illustrative implementations, drawings, and techniques illustrated below.

I. Overview

The present disclosure describes a framework and methods that enable mobilization of a workforce that would otherwise be bound to an office or remote terminal in their home in order to carry out tasks such as problem management. In a system monitored and managed by the workforce individuals, automated processes monitor various aspects of the system in order to generate an alert if certain circumstances occur, such as when a threshold is exceeded, when a malfunction occurs, or when a sensor is activated. The novel framework of the present disclosure implements business logic and supports customized applications for the monitored system in order to selectively notify an appropriate user of a problem by way of a notification sent to his or her mobile device. In response to the notification, the user may react by performing diagnostic tasks from his or her mobile device, and may address the diagnosed problem with a remedy from his or her mobile device. By virtue of the mobile device's carrier-controlled nature, the mobile device and the present framework offer unique security authentication, confirmed delivery of notification messages, and the capability to track status and progress on problem diagnostics and resolution performed on the mobile device.

Activities such as remote notification, diagnosis, and remediation are supported through components in the carrier framework (which may be implemented client-side, server-side, or distributed over both). The carrier framework enables customized applications that implement business or domain specific functionality on top of the carrier framework. Examples of such customized applications will be discussed in detail below to provide clarity on the functionality of the carrier framework.

The following disclosure is divided into five sections including this overview. Section II defines terminology used in this disclosure. Section III describes in detail a carrier framework for remote notification, diagnostics, and remedy management that implements methods discussed in section IV. Section V discusses various proposed applications, in order to clarify features and advantages of the present disclosure. Section VI describes a general purpose computer on which parts of the various systems and methods of the present disclosure may be implemented.

II. Terminology

As used herein, the term "presence" on a mobile device refers to the readiness and willingness of a user to communicate on the telecommunications network. For example, a user may exhibit his presence by turning on his mobile device, or by opening an application that indicates an "active" state when he is available, or an "away" state when he is not available.

As used herein, the term "WAP" refers to a media type similar to internet web pages, but formatted in Wireless Application Protocol, a protocol created for mobile devices such as PDAs and mobile phones, designed to give users a richer data application experience that would enable "access to the Internet" through mobile devices. In the context of a WAP page, a "push" refers to WAP pages that are directed to a mobile device without subscriber initiation.

As used herein, the term "SMS" refers to Short Message System ("SMS"), a service available on most digital mobile phones that permits the sending of short messages (also known as text messages, messages, or more colloquially SMSes, texts or even txts) between mobile phones, other handheld devices. SMS messages may be used to selectively push notification messages. SMS messages may include two way messaging.

As used herein, the term "Multi-media video" refers to content that is played on a media player on the mobile device, similar to playing audio/video using Microsoft Media Player or Apple's QuickTime Pro on a computer. According to various embodiments, notification of problems may be sent via a multi-media stream, or diagnostic views may be obtained through a multi-media stream.

As used herein, the term "XML" refers to an Extensible Markup Language document or stream that may be used for sending notification of problems, or obtaining diagnostic information.

As used herein, the term "video email" refers to an email that includes a video clip embedded in or attached to the email.

As used herein, the term "media types" refers to the manner, technologically speaking, that data may be presented to a user in a mobile device. For example, some media types may include WAP, multi-media video, SMS and email.

As used herein, the term "carrier" refers to a telecommunications company that provides communication services for a mobile device under a subscriber agreement.

III. General System Architecture

FIG. 1 is a block diagram of a high-level architecture for a system 100 for remote notification, diagnostics, and remedy management. The system 100 includes one or more mobile devices 102 and the monitored system(s) 104. The illustrated mobile device 102 includes various client-side customized applications 106, in accordance with the particular tasks for which the user of the mobile device is responsible, and the client-side framework 108 coupled to the client-side customized applications 106 via adaptors 110.

In various embodiments, the mobile devices 102 take the form of a cellular or wireless telephone, personal digital assistant ("PDA"), handheld computer, or the like operable as a mobile communication device when used in conjunction with telecommunication services provided by a carrier. In some embodiments, the mobile device 102 may include, in addition to its basic functionality for telecommunication, a browser, a Java Virtual Machine ("JVM"), and various J2ME applications, a display and user interface.

The system 100 further includes a server-side framework 112 that couples to the server-side customized applications 114 via adaptors 116. The server-side customized applications 114 couple to the monitored system(s) 104. In various embodiments, the monitored system(s) 104 may include computer systems, databases, servers, medical devices, call management systems, security systems, and various other such systems which may provide some form of automated processes to monitor the status of the system and which may call for maintenance, repair or other attention of a user. The client-side framework 108 and the server-side framework 112 communicate via the carrier network 120.

The client-side framework 108 and server-side framework 112 together form the application enabling carrier framework generally referred to herein. The carrier framework functions discussed may be implemented in the client side, the server side, and/or distributed over the two in various embodiments. The carrier framework may include software modules executing on a server or computer system. The software modules are enabled with business logic operable to pass "smart" communications between the mobile device 102 and the monitored system(s) 104, as opposed to "dumb" communications typically passed in a Virtual Private Network ("VPN") tunnel connection or the like in point-to-point solutions unlike the present carrier framework. "Smart" communications, as referred to herein, make use of the business logic and customized applications of the present framework, while "dumb" communications refer to communications passing through a basic point-to-point connection that does not provide additional logic or processing en route.

A plurality of customized applications sit on the framework, each operable to meet the various different needs of users, but sharing the carrier framework to communicate over the carrier network. Examples of applications of various different customized applications are discussed further below.

In an illustrative embodiment as shown in FIG. 1, one customized application 114 monitoring a system 104 for a particular enterprise client detects a problem in the monitored system 104, such as a sensor being triggered. The customized application 114 signals the server-side framework 112 and an alert or notification is generated by the server-side framework 112. The notification may be a simple text message, form alert signal, or may include data, such as an audio or video file, that is added to the message before sending. Thus generation of the notification may include checking for pertinent data to include in the message, extracting the data from its source, and adding the data to a form automated message. The notification is communicated as an XML message over a socket connection to the client-side framework 108. As the user of the mobile device 102 responds to the notification, one or more corresponding client-side customized applications 106 may be initiated to generate an HTTP request for data, which is conveyed from the client-side framework 108 via the carrier network 120 back to the server-side framework 112. The HTTP request may include, for example, code to retrieve and possibly reformat data for diagnostic purposes, or code to execute instructions in a customized server-side application 114 to implement one or more remedial changes to the monitored system 104. The reply to the HTTP request may be an XML message or HTTP message conveyed back to the client-side framework 108, and thence to the client-side customized applications 106, via the carrier network 120.

The present disclosure obviates any need for initiating a separate remote connection for each desired application. Rather, the present disclosure enables smart communications with multiple applications via a single "smart" connection that implements business logic rules. The carrier framework further enables support in a common manner for each of the carrier's different enterprise clients for meeting different needs and supporting customized applications on a single common framework.

Figure 2:
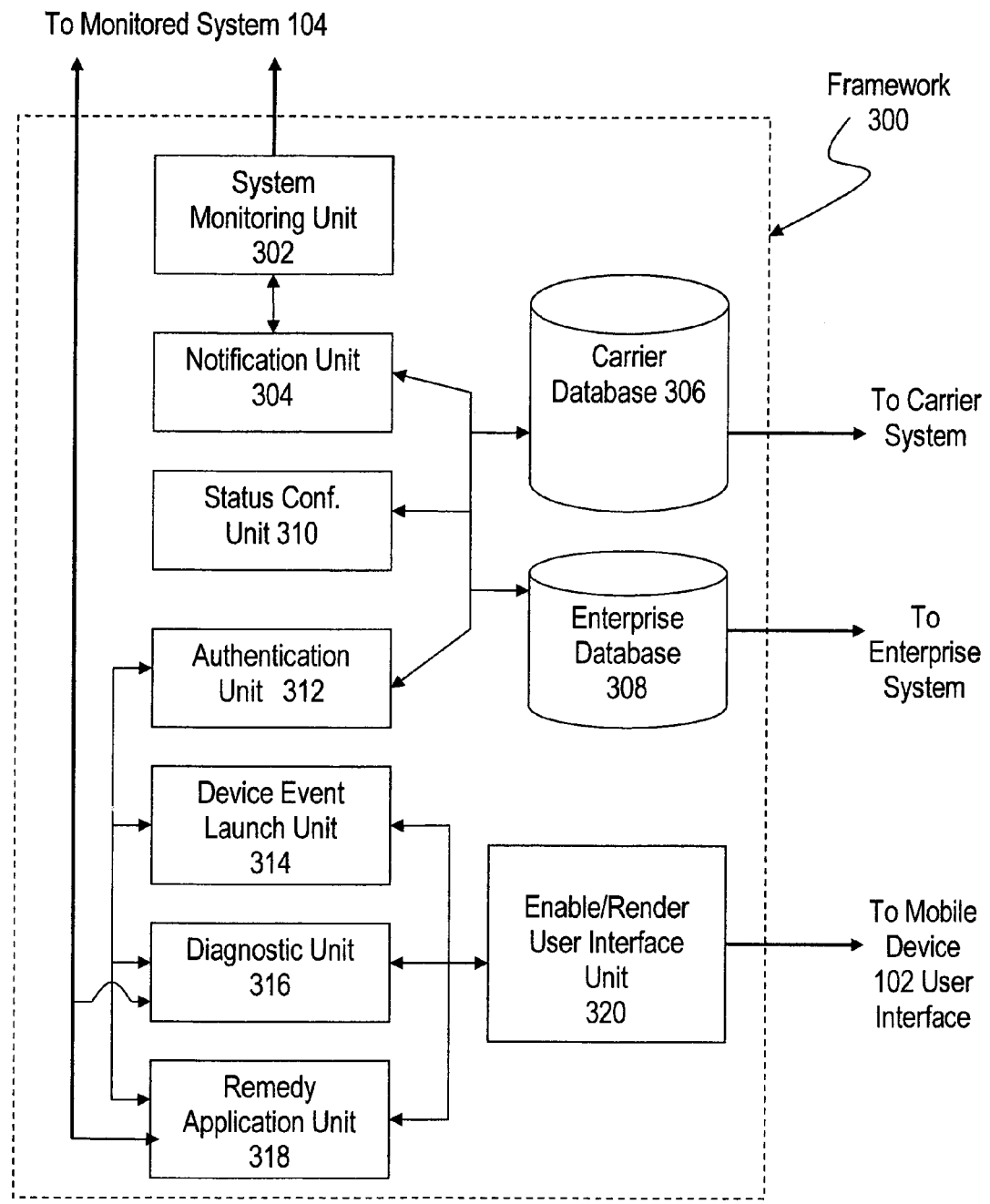
FIG. 2 is a block diagram of an embodiment of the framework according to various embodiments of the present disclosure.

As mentioned previously, the client-side framework 108 and server-side framework 112 together generally form the carrier framework. In various embodiments, the carrier framework may be implemented in the client side, the server side, and/or distributed over the two and synchronized with one another, or may be implemented in a dedicated server in the carrier network. FIG. 2 shows a block diagram of an illustrative carrier framework 300. The components of the carrier framework 300 include a system monitoring unit 302, a notification unit 304, a carrier database 306, an enterprise database 308, a status confirmation unit 310, an authentication unit 312, a device event launch unit 314, a diagnostic unit 316, a remedial application unit 318, and an enable/render user interface unit 320, each of which are discussed in turn below.

The system monitoring unit 302 is coupled to the monitored system(s) 104 to receive data from the monitored system(s) 104 and to determine when a problem arises. The system monitoring unit 302 may execute automated processes to determine when one or more values exceed a threshold, when a certain amount of time has gone by, when a sensor is activated, when an error in the system occurs, and the like, thereby indicating that a problem exists in the monitored system 104. The nature of the system monitoring unit 302 depends on the specific monitored system(s) 104 and the nature of the customized applications that may be used to diagnose and remedy the problem.

The notification unit 304 is coupled to the system monitoring unit 302. When the system monitoring unit 302 detects that a problem has arisen (by virtue of an exceeded threshold, expired timer, sensor, etc.), the notification unit 304 generates an alert to notify the appropriate person(s) responsible for managing and resolving problems with the particular monitored system 104. Specifically, the notification unit 304 may select a single person to receive the alert, or a group of people. The alert may include any of various media types of messages that are used by and with mobile devices, including, but not limited to, email alert, a WAP push alert, SMS alert (either voice or text, and including 2 way SMS messaging), and video email.

The notification unit 304 includes business logic that selects the appropriate person(s) to whom the alert should be directed. Specifically, business logic may include rules that any alerts should be directed to any problem solver or group of problem solvers who is/are on-call at the time the problem arises. The business logic may further include a rule that any alerts should be directed to any problem solver(s) that is "present" on his or her device, meaning that he or she is active on the mobile device 102. To apply the business logic and alert the appropriate person(s) under the rules, the notification unit 304 accesses various data sources, including the carrier database 306 and the enterprise database 308.

The carrier database 306 is maintained by the carrier to store subscriber activity data. Subscriber activity data provides detailed information regarding presence as a function of the fact that carriers are in a unique position of knowing, to some degree, what its subscribers are doing with the mobile devices substantially all the time. The carrier is in a position to know which subscribers have shut off their devices, which are actively using the devices for telecommunication, and which applications each subscriber is presently using. The carrier database 306 maintains a log of subscriber activity. The notification unit 304 can access the stored data to determine if a given subscriber, or group of subscribers, is actively using their mobile device, or if, for instance, the subscriber has shut off the device to go to sleep. The carrier database 306 may also associate subscriber activity with specific subscriber identifiers and device identifiers, such that all activity carried out from a given mobile device is associated with a specific user.

The enterprise database 308 is a database that maintains the schedules of the people involved in problem management and resolution, such that the notification unit 304 can access the data to determine if a given subscriber, or group of subscribers, is on-call, and thus should be alerted as to problems, or is not on-call, and thus does not need to be included in the alert. The enterprise database 308 may also maintain logs of previous problems and the diagnostics and remedies used in resolving them.

The status confirmation unit 310 is coupled to the notification unit 304, the carrier database 306 and the enterprise database 308. The status confirmation unit 310 is operable to confirm delivery of an alert to the appropriate person(s) selected by the notification unit 304. The carrier is in a unique position to guarantee and confirm when an alert has been received since the carrier has access to data about what the subscriber is doing with the mobile device (i.e., in the carrier database). For instance, the carrier has access to know that, in response to receiving an alert, a user has opened the browser to a WAP-based interface for problem solving, or opened a JAVA application from which problem solving-scripts may be run.

In addition to confirming delivery of alerts, the status confirmation unit 310 is operable to continually track the status of actions taken with the mobile device to resolve the problem. For example, whenever the user launches the diagnostic unit 316, the status confirmation unit 310 may confirm (for example, to managers or at the monitored system) that the user has begun diagnostic activities, and likewise, update the status again when the user launches the remedy application unit to begin applying a remedy to the diagnosed problem. Updating status in this manner helps in evaluating how quickly and efficiency problems are handled, when additional problem solvers are needed, and the like.

The authentication unit 312 is coupled to the notification unit 304, the carrier database 306, the enterprise database 308, and the status confirmation unit 310. The authentication unit 312 is operable to confirm the identity of the user of the mobile device and/or the identity of the mobile device itself. Specifically, by virtue of operating on a carrier network, authentication may occur at several different levels and in several ways. First, authentication by the authentication unit 312 may occur automatically, and transparently to the user in that a unique subscriber identifier and/or a device identifier may be contained in any request (such as an HTTP request) routed through the carrier framework between the mobile device 102 and the monitored system(s) 104. The authentication unit 312 may extract either the unique subscriber identifier or the device identifier (or both) to determine whether to permit access to data and/or the monitored system.

In addition, or alternatively, the authentication unit 312 may prompt the user for authentication information, such as a user name and/or a password. This prompt may supplement the authentication done transparently to the user, or may be an alternative performed instead of the transparent authentication discussed above. The different types of authentication (transparent-to-user and user-prompting) may be combined to provide a multiple tiered authentication system implemented in the authentication unit 312. For example, the authentication that is automatic and transparent to the user may be implemented at a first level that establishes access to the monitored system(s) 104 for diagnosis of problems. Then, for additional security the authentication unit 312 may prompt the user for a password or user name for a second level of authentication before permitting access that enables implementation of changes and remedies in the monitored system(s) 104. Another example may be when a device identifier must be authenticated before a notification may be viewed in that particular device, and then the unique subscriber identifier could be required for access to viewing the monitored system data in a diagnostic application. The specific level of authentication that is desirable for a given enterprise client would be selected according to the client's needs and level of proprietary security accessible from within the carrier framework.

The device event launch unit 314 is operable to initiate a specific activity on the mobile device 102 based on an alert generated by the notification unit 304. For example, the device event launch unit 314 may open a browser to the URL for a web-based interface for a certain type of problem when the notification unit 304 sends an alert for that type of problem. In another example, the device event launch unit 314 might open a video player application to playstreamed video in response to another type of alert. Further examples will be discussed in detail below. The device event launch unit 314 may be coupled to the status confirmation unit 310 such that when the device event launch unit 314 initiates a specific activity or application on the mobile device 102, the status confirmation unit 310 updates with the enterprise the latest activity on the mobile device 102 as progresses towards resolving the problem.

The application launched by the device event launch unit 314 may, in some embodiments, be determined by the type of the notification sent. For example, a WAP notification may automatically trigger the launch of a browser, or an email notification may launch an email program.

The diagnostic unit 316 couples the mobile device 102 to the monitored system 104, providing the user of the mobile device 102 access to data, statistics, views of the system, and any other information used in a particular customized application to determine where a problem is located, what the problem is, and possible remedies. The diagnostic unit 316 is coupled to the enable/render user interface unit 320. Because the format of data from the monitored system used in diagnosis may not originally be in a format useable by the mobile device 102, the enable/render user interface unit 320 converts data from the monitored system 104 into a format that the mobile device 102 can use, and when the user enters his or her actions through the mobile device 102 (either in response to an alert, a prompt or otherwise), the enable/render user interface unit 320 converts the user's entry into a format that the monitored system 104 can use.

The remedial application unit 318 couples the mobile device 102 to the monitored system 104, providing the user of the mobile device 102 a means to implement changes in the monitored system 104 to resolve the problem of which he was alerted. The remedial application unit 318 is also coupled to the enable/render user interface unit 320. Because the format of data from the monitored system used in remedying the problem may not originally be in a format useable by the mobile device 102, the enable/render user interface unit 320 converts data from the monitored system 104 into a format that the mobile device 102 can use, and likewise when the user enters his or her actions through the mobile device 102 (either in response to an alert, a prompt or otherwise), the enable/render user interface unit 320 converts the user's entry into a format that the monitored system 104 can use to remedy the problem.

IV. Method for Remote Notification, Diagnostics, and Remedy Management

Figure 3:
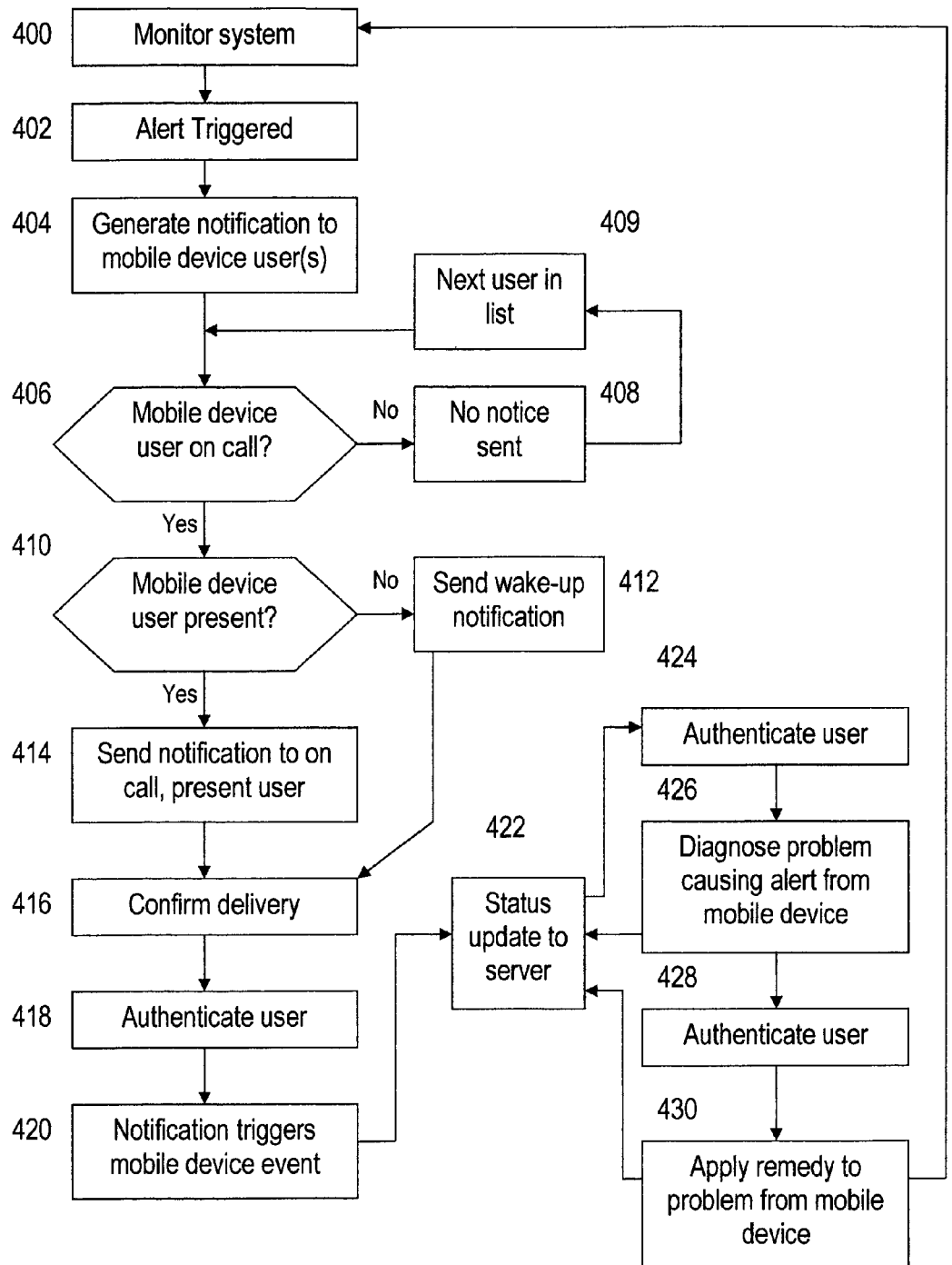
FIG. 3 is a flowchart of an illustrative method for remote notification, diagnostics, and remedy management according to various embodiments of the present disclosure.

Referring now to FIG. 3, a flowchart is shown of a method for remote notification, diagnostics, and remedy management. The method starts with the system monitoring unit 302 monitoring the system 104 (block 400). In block 402, an alert is triggered, for example, when a threshold value is exceeded in the system, a sensor is activated, a timer has expired, or the like, depending on the nature of the monitored system 104. The notification unit 304 generates a notification to mobile device users that are assigned problem solvers within the enterprise (block 404). Such problem solvers could include, for example, managers, IT or database administrators, customer service representatives, guards, in-house physicians, or any other type of problem solver who may be assigned the duty of handling problems when they arise in the monitored system 104.

Before sending the notification, the notification unit 304 evaluates, using business logic, whether a particular mobile device user is on-call from among the assigned problem solvers (block 406). If the specific mobile device user is not on call, then no notice is sent to that user from the list of assigned problem solvers (block 408), and the next individual from the group of problem solvers is identified (block 409). If the mobile device user is on call at the time the alert is triggered, then the notification unit 304 evaluates whether the mobile device user is "present," or in an active use of the mobile device, or if the mobile device is turned off or otherwise not active (block 410). If the mobile device user is not present and is on call, then the notification unit 304 sends to the mobile device 102 a "wake-up" notification (block 412), indicating to the user that he or she should initiate an active session, turn on their mobile device, or inform the user in some other manner that a problem has arisen. If the mobile device user is present and is on call, then the notification unit 304 sends to the mobile device 102 a notification of the problem (block 414). The notification may be of any type that may be received by the mobile device 102, and may alert the mobile device user to the fact that a problem has arisen by text, voice, video, or other attention-getting format.

Upon delivery of the notification (of either type, wake-up or otherwise), the status confirmation unit 310 confirms with the carrier and/or enterprise that the notification was delivered to the mobile device (block 416). Because a carrier network is used to deliver the notification, confirmation of delivery can occur automatically, even without requiring the receiving mobile device to respond, such as in the case of a two-way pager or generation of a confirmation receipt email. Specifically, in the case of a two-way pager, confirmation may be obtained, however, the pager is required to generate a response, in that confirmation cannot be obtained by knowledge of the network such as with the present disclosure. Likewise, an email device could be operable to generate a confirmation email, but it would require the receiving mobile device to respond.

The process also includes authentication by the authentication unit 314 (block 418). Authentication in the present framework is unique based on carrier ability, compared to, for example, wireless internet or VPN (Virtual Private Network) type access. Specifically, in any action initiated at the mobile device 102, a subscriber identifier and device identifier are passed in the resulting communication (such as inserted into an HTTP request), so that the carrier network identifies the device and the subscribing user even without prompting the user for a user name and/or password, thereby adding another layer of security. Authentication may include verifying that actions taken on the mobile device 102 are being performed by an approved problem solver by comparing the subscriber identifier and/or device identifier with the identifiers for the problem solver in the carrier database 306. Authentication may also additionally include prompting the user of the mobile device 102 to provide a user name and password. At various points in time in the process for notification, diagnostics, and remediation, any degree of security desired may be accomplished by any combination of the authentication described here.

In block 420, the notification triggers a mobile device event initiated by the device event launch unit 314. Specifically, for a present, on-call problem solver who receives the notification, the framework triggers an application or other device event to aid the notified problem solver in getting started on resolution of the problem. For example, upon receiving a notification regarding a specific type of problem, the device event launch unit 314 opens a browser to a link for a web-based problem solving interface to enable the user to immediately begin process on problem resolution, without having to search around or remember the URL for the interface. Similarly, upon receiving a notification regarding a specific type of problem that necessitates visual inspection by the user, the device event launch unit 314 might launch a video player in the mobile device 102 to stream video of the monitored system 104 to the mobile device 102 for the user to visually inspect for the problem of which he was notified.

During the process, the status confirmation unit 310 updates the carrier and/or the enterprise system as to the status of activities for resolving the problem (block 422). Such an update may include the fact that the device event launch unit 314 has initiated a particular application or action, or that the user has taken or completed various actions from within the diagnostic unit 316 or the remedy application unit 318.

At block 426, the diagnostic unit 316 enables the user of the mobile device 102 to access data, statistics, views of the system, and any other information used in a particular customized application to determine where a problem is located, what the problem is, and possible remedies from the mobile device 102 (i.e., without having to log in to a remote terminal over a VPN connection). At block 430, the remedy application unit 318 enables the user of the mobile device to implement changes or repairs in the monitored system 104 to resolve the problem of which he was alerted, or alternatively, initiate a call to someone else who is located in a location such that he or she may more immediately physically carry out any remedies that may not be performed from the mobile device 102.

Authentication may be required again at various times during the process, such as prior to permitting the user of the mobile device 102 access to limited-access, proprietary data during diagnosis (re-authentication at block 424) or such as prior to permitting the user of the mobile device 102 access to making system changes or repairs during problem remediation (re-authentication at block 428).

V. Proposed Applications and Uses

Information Technology or Database Administrator

In one illustrative application, the problem solver carrying out his functions from a mobile device is an Information Technology or Database Administrator. A group of system administrators could all be assigned to such duties, with each taking turns at being the on-call individual. The present framework enables simplified building, deployment and execution of mobile applications, freeing such an administrator from his office or a remote terminal from his home when he is on-call to monitor, diagnose, and remedy problems arising in the servers or databases he administers. Existing monitoring systems may be used to monitor the server or database that the administrator is responsible for, and when a problem arises, such as a server crash, an alert is triggered. The framework generates a notification to the administrator (in other embodiments to a group of administrators), or simply to the individual(s) who is/are both on-call and "present," meaning that they are scheduled to handle crashes and their mobile devices are turned on. Upon delivery of the notification to the on-call and present user(s), the framework confirms delivery of the notification, so that the enterprise (i.e., managers and the like) are on notice that at least one administrator is aware of the problem and working to resolve it. The framework authenticates the administrator as being an individual with approved access to diagnostic functions of the server, based on his mobile device subscriber identifier and his mobile device's identifier, or may require additional authentication at a prompt, in response to which the administrator would provide a user name and password.

From the mobile device, the administrator would be able to access the log of activity on the server prior to the crash, determine what caused the crash and diagnose how the server might be restored, from the point of his mobile device. While carrying out the diagnostic activities, the framework updates the enterprise as to the activities undertaken by the administrator on his mobile device. From the mobile device, the administrator would be able to execute a script to re-boot the server and repair any cause of the crash that he detected during diagnostics. While carrying out these remedial activities to restore the server, the framework updates the enterprise as to the activities undertaken by the administrator on his mobile device. Depending on the level of security involved in the network administration, the user could be re-authenticated, or asked for additional authentication for specific activities or accesses. Using this framework, the administrator is freed from the office and remote terminal, such that he could carry out his job functions while watching his son's baseball game, while stuck in traffic, or while waiting at the airport.

Physician

In another illustrative application, the problem solver carrying out his functions from a mobile device is a physician. A group of in-house physicians, such as residents and attending physicians are all assigned to on-call duties overnight in the hospital or care facility. The present framework enables simplified building, deployment and execution of mobile applications, freeing such physicians from the premises of the hospital to review test results, scans, and monitor patients in order to make diagnosis decisions and give orders. Existing monitoring systems may be used to monitor the patient that the physician is responsible for (either automatically through sensors connected to the patient's body or manually through measurements and recordings made by nursing staff), and when a problem arises with the patient, such as a change in temperature or heart rate, an alert to the physician is automatically triggered based on thresholds previously set by the physician in the monitoring system. The framework generates a notification to the group of in-house physicians, or simply to the individual(s) of the group who is/are both on-call and "present," meaning that they are scheduled to handle patient problems during a given time period and their mobile devices are turned on. Upon delivery of the notification to the on-call and present user(s), the framework confirms delivery of the notification, so that the enterprise (i.e., hospital administrators, department chief, or attending that supervises residents and the like) are on notice that at least one on-call, present physician was notified, is aware of the problem and is working to resolve it. Confirmation further adds to the electronically kept medical records of the patient for assisting with future medical care and for liability purposes.

The framework authenticates the physician as being an individual with approved access to confidential patient records for the monitored patient, based on his mobile device subscriber identifier and his mobile device's identifier, or may require additional authentication at a prompt, in response to which the physician would provide a user name and password. For example, under HIPAA (Health Insurance Portability and Accountability Act) privacy requirements, there are strict limitations on who may access confidential patient information and for what purposes, and therefore, a secondary prompt, asking for re-authentication of the user, would be used when the physician accesses this type of patient information for diagnostic purposes. Likewise, a group of responding physicians, in a case where the physicians are consulting one another or working in a team, would be authenticated.

Once notified, the physician would be able to, from his mobile device, access the patient's records, such as vital statistics over the past few hours, as well as review recent test results, such as a CT scan to determine the cause for the patient's change in status. In a situation where a group of physicians respond, each of the group would likewise have access. While carrying out the diagnostic activities, the framework updates the enterprise as to the activities undertaken by the physician(s) on his mobile device, such as review of test results and statistics. From the mobile device, the physician or physicians would be able to order additional tests, as needed, or enter an order for a prescription to be filled, or for a nurse to administer a prescribed amount of a certain drug in order to remedy the patient's declining condition. While the physician or physicians carries out these remedial activities to care for the patient from the point of his mobile device, the framework updates the enterprise (again, supervisors, hospital administrators and medical records) as to the activities undertaken by the physician on his mobile device. Using this framework and customized applications to interface with existing medical systems, each physician is free to move through-out the hospital to tend to other patients or issues, and even perform some of his on-call duties from outside the hospital, such as at home, the store, or while riding the subway. Additionally, groups of physicians would be able to consult with one another without having to be physically in the same location.

Security System Administrator/Guard

In yet another illustrative application, the problem solver carrying out his functions from a mobile device is a security system administrator or guard. A group of security guards and administrators may rotate for on-call duties overnight or otherwise undesirable shifts. The present framework enables simplified building, deployment and execution of mobile applications, freeing such security officers to provide adequate security by making rounds, checking out alarms, and the like without limiting them to the premises. Existing monitoring security systems, including automated alarms and cameras, may be used to monitor the premises that the officer or administrator is responsible for securing, and when a problem arises on premises or along the perimeter, such as an alarm indicating that a door is being forced open, an alert to the guard is automatically triggered based on thresholds set in the monitoring system. The framework generates a notification to the group of security officers, or to the individual(s) of the group who is/are both on-call and "present," meaning that they are scheduled to handle security breaches during a given time period and their mobile devices are turned on. In an embodiment, when a group of individuals is notified, when one of the notified individuals initiates a response to handle the problem, the others may be notified that he is handling it, and instructed to be on stand-by. While on stand-by, the others may monitor the actions taken by the individual who is responding, or receive updates on the status. The individual who is responding may additionally request their aid, and at such point in time, the others may initiate actions to aid in the response by the first individual to respond.

Upon delivery of the notification to the on-call and present user(s), the framework confirms delivery of the notification, so that the enterprise is on notice that at least one on-call, "present" security officer was notified, is aware of the problem and is working to resolve it. Additionally, upon delivery of the notification to the user, the framework launches an application used in resolving the problem. In this case, the launched application may be a video player that plays streamed video from the security system from the camera that monitors the location on premises where the alarm was triggered. By doing so, the user can immediately check out whether the alarm is actually triggered by looking to see if burglars are present in the camera view, or whether the alarm was falsely triggered. Viewing the streamed video from the security system on his mobile device, in this case, is the diagnostic step that he is enabled to perform from the point of his mobile device.

While the guard carries out these diagnostic activities that are analogous to the guard making rounds on premises, the framework updates the enterprise as to the activities undertaken by the guard on his mobile device, such as viewing the camera monitored areas. Based on what he sees, the guard would be able to call the police or connect the security system to the police, or alert other guards to assist him with resolving the problem, thereby remedying the problem. While the guard carries out these remedial activities to handle the problem on premises from the point of his mobile device, the framework updates the enterprise (such as security supervisors or other guards checking in to see if they need to take action) as to the activities undertaken by the guard on his mobile device. Using this framework and customized applications to interface with existing security systems, the security guard is free to move through-out the premises and handle problems in other parts of the facility, or even leave the premises to eat a meal, but still monitor all of the monitored facility adequately.

Call Center Call Traffic Manager In still another illustrative application, the problem solver carrying out his functions from a mobile device is Call Center Traffic Manager, such as for a Customer Service Center that takes calls for assistance from customers. An individual from a group of call center administrators could all be assigned to such duties, with each taking turns at being the on-call individual for certain time periods. The present framework enables simplified building, deployment and execution of mobile applications, freeing such an administrator from his office or a remote terminal from his home when working to monitor call traffic levels and determine when additional employees are needed to handle the level of call traffic in the call system he administers.

Existing call traffic monitoring systems may be used to track traffic levels in the call center that the administrator is responsible for, and when a problem arises, such as a predetermined number of calls being placed on hold for a lack of personnel to handle them, an alert is triggered. Based on the alert, the framework selectively generates a notification to the individual who is both on-call and "present," meaning that they are scheduled to handle crashes and their mobile device is turned on and active. Upon delivery of the notification to the on-call and "present" call traffic manager, the framework confirms delivery of the notification, so that the enterprise (i.e., supervisors and the like) are aware that the manager is aware of the problem and working to resolve it. The framework may require authentication for the administrator, proving that he is an individual with approved access to monitor different areas of the call traffic system, based on his mobile device subscriber identifier and his mobile device's identifier, or may require additional authentication at a prompt, in response to which the manager would provide a user name and password.

Upon delivery of the notification to the manager, the appropriate application in the mobile device for monitoring call traffic would launch in his mobile device for immediate review of the traffic problem. For example, the mobile device would open to the application that displays how calls are apportioned among the available personnel as well as the percentage of personnel time being consumed in handling calls. By displaying the traffic graphically in the mobile device in such an application, the manager would be able to quickly identify where a traffic problem exists, such as too much traffic among customer service calls and too little traffic among billing calls.

By examining the call traffic in the launched application from the mobile device, the manager would be able to assess the call traffic when an alarm, such as for exceeding or falling below a predetermined threshold, to determine whether additional personnel should be brought in or sent home, and whether personnel should be reassigned within the call traffic center to assist in handling the busiest area of calls. Additionally, from the mobile device, the manager would be able to notify personnel (by an email, SMS text message or phone call) that they need to report for duty, or release on-call personnel not needed, and the like, in order to address the call traffic problem to which he was alerted, thereby remedying the problem. Depending on the level of security involved in the network administration, the user could be re-authenticated, or asked for additional authentication for specific activities or accesses. Using this framework, the manager is freed from the office and remote terminal, such that he could carry out his job functions from any location, and continuously get feedback on his changes in call center personnel even while traveling out of the office or at home.

VI. General Purpose Computer Implementation

Figure 4:
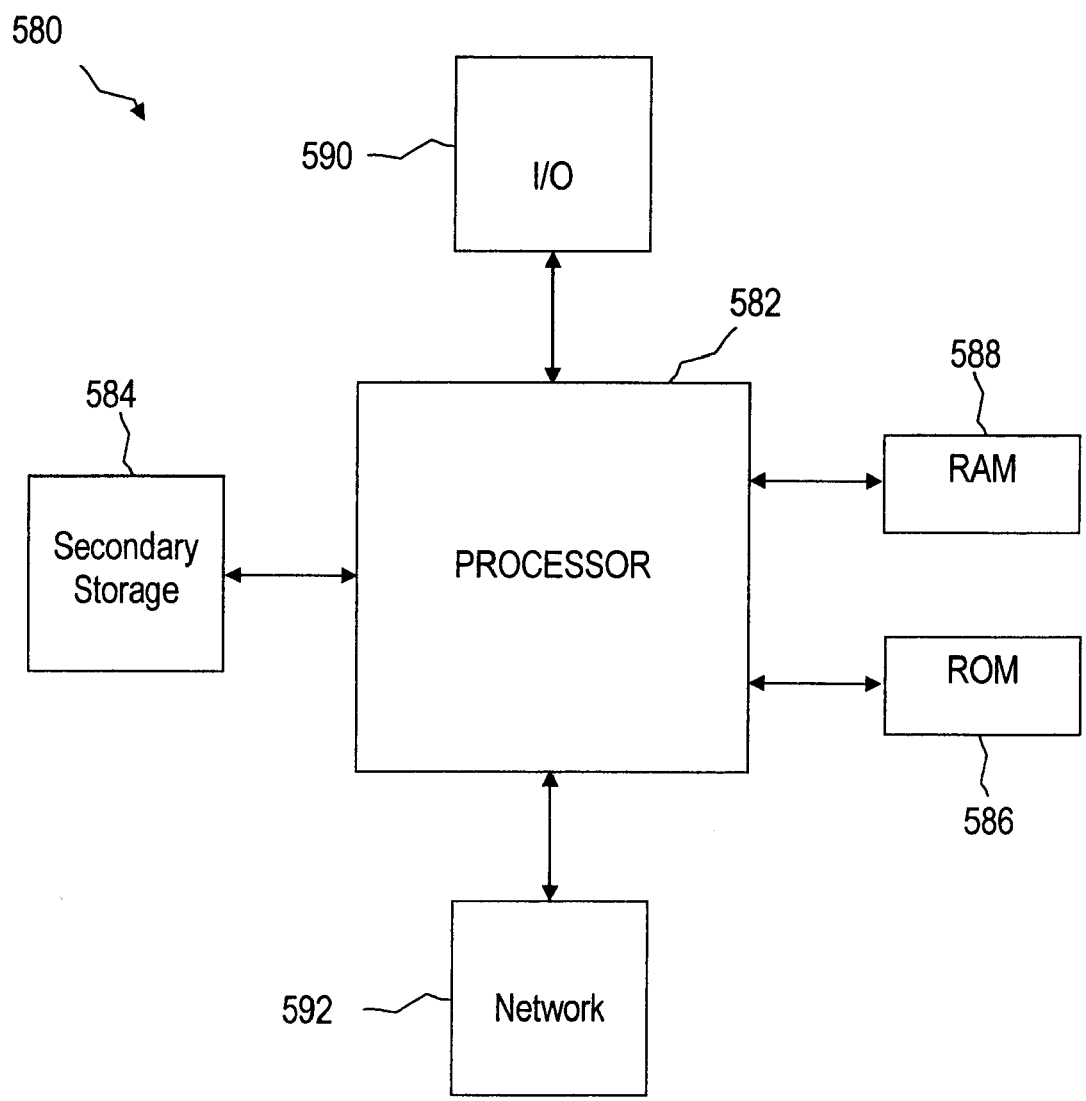
FIG. 4 shows an illustrative general purpose computer system suitable for implementing, at least in part, the several embodiments of the disclosure.

The present disclosure may be implemented, at least partially, on a server or on any general-purpose computer(s) with sufficient processing power, memory resources, and network throughput capability to handle the necessary workload placed upon it, including a server. FIG. 4 illustrates a typical, general-purpose computer system suitable for implementing one or more embodiments disclosed herein. The computer system 580 includes a processor 582 (which may be referred to as a central processor unit or CPU) that is in communication with memory devices including secondary storage 584, reads only memory (ROM) 586, random access memory (RAM) 588, input/output (I/O) devices 590, and network connectivity devices 592. The processor may be implemented as one or more CPU chips.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are reads during program execution. ROM 586 is a non-volatile memory device which typically has a small memory capacity relative to the larger memory capacity of secondary storage. The RAM 588 is used to store volatile data and perhaps to store instructions. Access to both ROM 586 and RAM 588 is typically faster than to secondary storage 584.

I/O devices 590 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 592 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 592 may enable the processor 582 to communicate with an Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave.

Such information, which may include data or instructions to be executed using processor 582 for example, may be received from and outputted to the network, for example, in the form of a computer data baseband signal or signal embodied in a carrier wave. The baseband signal or signal embodied in the carrier wave generated by the network connectivity devices 592 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. An application-enabling carrier framework in a carrier network, the carrier framework comprising:
    a notification unit that, when a problem is detected within a monitored system, sends a notification to a mobile device of a user, wherein the monitored system is distinct from the mobile device;
    a status confirmation unit that confirms delivery of the notification to the mobile device without requiring action by the mobile device and without requiring action by the user;
    an authentication unit that authenticates the identity of the user according to at least one of 1) the user's subscriber identifier, and 2) the user's mobile device identifier;
    a diagnostic unit that provides the mobile device with access to diagnostic data of the monitored system through a customized application that enables the user to review monitored system data from the mobile device; and
    a remedy application unit that provides the mobile device with access to instructions that implement one or more remedial changes to the monitored system through a customized application that enables the user to execute actions to remedy the problem in the monitored system data from the mobile device.

2. The carrier framework of claim 1, wherein the notification unit further applies a business logic rule to select a user to notify of the problem.

3. The carrier framework of claim 2, further comprising a carrier database that stores the business logic rules that determine a status of each user on the network as present or inactive, and scheduled as on-call or not on-call.

4. The carrier framework of claim 1, wherein the authentication unit further authenticates the identity of the user at a second layer according to a user name password identifier provided by the user at a prompt.

5. The carrier framework of claim 1, further comprising a device event launch unit that initiates an application on the mobile device when the notification is delivered to enable immediate action by the user to address the problem.

6. The carrier framework of claim 1, further comprising an enable/render user interface unit that reformats data from the monitored system into a format useable by the mobile device.

7. The carrier framework of claim 1, wherein the status confirmation unit is further configured to track activity by the user on the mobile device taken towards diagnosing or resolving the problem, and update the monitored system as to progress or completion of problem resolution.

8. The carrier framework of claim 1, wherein the carrier framework supports a plurality of varying customized applications for remote notification, diagnostics and remedy management of a plurality of unrelated monitored systems on the behalf of carrier subscribers.

9. A system for remote notification, diagnostic, and remedy management comprising:
    a mobile device configured for communication on a carrier network;
    a monitored apparatus having one or more preset conditions that trigger an alert when a problem arises with the apparatus wherein the monitored apparatus is distinct from the mobile device;
    a customized application that accesses the monitored apparatus via the carrier network and a carrier framework;
    the carrier framework that interfaces the customized application and the mobile device, the carrier framework comprising:
        a notification unit that sends a notification to the mobile device of a user when a problem is detected within a monitored system;
        a status confirmation unit that confirms delivery of the notification to the mobile device without requiring action by the mobile device and without requiring action by the user;
        an authentication unit that authenticates the identity of the user according to at least one of 1) the user's subscriber identifier, 2) the user's mobile device identifier;
        a diagnostic unit coupled to the authentication unit that provides the mobile device with access to diagnostic data of the monitored system and facilitates the user's review of the monitored system from the mobile device; and
        a remedy application unit that provides the mobile device with instructions that implement remedial changes in the monitored system and facilitates the user to remedy the problem in the monitored system from the mobile device.

10. The system of claim 9, wherein the customized application provides access to ongoing functions and data records of the monitored apparatus for diagnostic activity by the user.

11. The system of claim 9, wherein the customized application provides access to ongoing functions for making changes or repairs for remedying activity by the user.

12. The system of claim 9, wherein the carrier framework further comprises a device event launch unit that initiates an application on the mobile device when the notification is delivered to enable immediate action by the user to address the problem.

13. The system of claim 9, wherein the notification unit applies a business logic rule to select a user to notify of the problem.

14. The system of claim 13, wherein the carrier framework further comprises:
- an enable/render user interface unit that reformats data from the monitored system into a format useable by the mobile device; and
- a carrier database that stores the business logic rules that determine a status of each user on the network as "present" or inactive and scheduled as on-call or not on-call.

15. The system of claim 9, wherein the status confirmation unit is further configured to track activity by the user on the mobile device taken towards diagnosing or resolving the problem, and update the monitored system as to progress or completion of problem resolution.

16. The system of claim 9, wherein the carrier framework supports a plurality of customized applications for remote notification, diagnostics and remedy management of a plurality of unrelated monitored systems on the behalf of carrier subscribers.

17. The system of claim 9, wherein the authentication unit authenticates the identity of the user at a second layer according to a user name password identifier provided by the user at a prompt.

* * * * *